US008991910B2

(12) United States Patent
Lacroix

(10) Patent No.: US 8,991,910 B2
(45) Date of Patent: Mar. 31, 2015

(54) WATER DRAIN VALVE FOR THE WATER BOX OF A MOTOR VEHICLE

(71) Applicant: GM Global Technology Operations LLC, Detroit, MI (US)

(72) Inventor: Joachim Lacroix, Flonheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/938,790

(22) Filed: Jul. 10, 2013

(65) Prior Publication Data

US 2014/0015286 A1    Jan. 16, 2014

(30) Foreign Application Priority Data

Jul. 11, 2012  (DE) .......................... 10 2012 013 731

(51) Int. Cl.
*B60R 13/07*   (2006.01)
*B62D 25/24*   (2006.01)

(52) U.S. Cl.
CPC ................ *B60R 13/07* (2013.01); *B62D 25/24* (2013.01)
USPC ....................................................... 296/208

(58) Field of Classification Search
CPC .... B60R 13/07; B60R 13/0838; B60K 11/06; B60J 7/0084
USPC ................... 296/208, 192, 163; 454/147, 158
See application file for complete search history.

(56) References Cited

U.S. PATENT DOCUMENTS

| 4,762,149 | A | 8/1988 | Pickl, Jr. |
| 5,709,309 | A | 1/1998 | Gallagher et al. |
| 7,455,192 | B2 * | 11/2008 | Siragusa ..................... 220/789 |
| 2008/0246311 | A1 * | 10/2008 | Hagino et al. ............... 296/192 |

FOREIGN PATENT DOCUMENTS

| DE | 1228948 B | 11/1966 |
| DE | 602005002184 T2 | 6/2008 |
| DE | 102007026543 A1 | 12/2008 |
| DE | 102009026222 A1 | 2/2011 |
| JP | 2005313692 A | 11/2005 |

OTHER PUBLICATIONS

German Patent Office, German Search Report for Application No. 102012013731.1, dated Mar. 4, 2013.

* cited by examiner

*Primary Examiner* — Joseph D Pape
*Assistant Examiner* — Dana Ivey
(74) *Attorney, Agent, or Firm* — Ingrassia Fisher & Lorenz, P.C.

(57) ABSTRACT

A water drain valve is provided for a water box drain channel of a motor vehicle, which includes, but is not limited to a support that can be attached to the water box drain channel, on which an elastically bent sealing lip supports itself in its middle region, which extends on both sides of the support in downstream direction and sealingly presses at least one part of a downstream sealing lip edge against a sealing surface that can be connected to the water box drain channel.

17 Claims, 1 Drawing Sheet

//  WATER DRAIN VALVE FOR THE WATER BOX OF A MOTOR VEHICLE

CROSS-REFERENCE TO RELATED APPLICATION

This application claims priority to German Patent Application No. 102012013731.1, filed Jul. 11, 2012, which is incorporated herein by reference in its entirety.

TECHNICAL FIELD

The technical field relates to a water drain valve for a water box drain channel of a motor vehicle.

BACKGROUND

A water drain valve is known from DE 60 2005 002 184 T2, in which the water box drain channel ends largely horizontally and sealingly presses a plastic lip fixed at the top in a tiltable manner against the edge of the drain channel. On its outside the plastic lip comprises a bead, the weight and lever arm of that presses the plastic lip into the position that closes off the drain channel. Through onflowing water, the plastic lip can lift off the edge, thus making possible the outflow of the water. Following this, it closes again under the effect of its own weight, i.e., mainly of the bead weight.

At least one object is to provide a structurally compact and simple water drain valve, which can be used under the cramped conditions in the engine compartment of modern motor vehicles, which furthermore makes possible a reliable sealing with respect to gases, in particular exhaust gases and which reliably discharges the water out of the water box. In addition, other objects, desirable features and characteristics will become apparent from the subsequent summary and detailed description, and the appended claims, taken in conjunction with the accompanying drawings and this background.

SUMMARY

A water drain valve comprises a support that can be attached to the water box drain channel, on which an elastically bent sealing lip supports itself in its middle region, which extends on both sides of the support in downstream direction and sealingly presses at least one part of a downstream sealing lip edge against a sealing surface that can be connected to the water box drain channel.

The water drain valve comprises a sealing lip, which in the middle is linearly held and fixed on the channel wall via a brace and is curved downwards towards both sides. The sealing lip is elastically deformed and thus sealingly presses in its outer edge regions against the channel wall from the bottom. Inflowing water then runs either along the one or other region of the sealing lip that extends downwards and collects at the end. Provided that the weight of the collected water exceeds the elastic contact force of the sealing lip, the latter is lowered and thus opens gaps for water to exit.

The water drain valve is structurally highly compact since it is directly integrated in the drain channel and requires no additional separate installation space. Through the curved shape of the sealing lip the water arriving from the top is directed along the two sealing lip halves sloping downwards where it can drain. Furthermore, the water drain valve is structurally very simple because in addition to the components such as support and shoulders molded on in the drain channel it only comprises the sealing lip, which is easily mounted.

According to an embodiment, the drain channel has a cross section in the manner of an elongated hole, as a result of which the installation space in longitudinal direction of the vehicle is reduced compared with a round cross section.

According to an embodiment, the support extends along the smaller of the two main axes of the drain channel cross section. In this way, with given stiffness of the sealing lip, because of the longer distance from the bearing on the support to the sealing bearing points on the shoulder an easier opening of the valve when water enters can be achieved than if the support were to extend along the longer main axis.

According to an embodiment, the support comprises a plurality of fixing pins directed upwards and the sealing lip a corresponding number of fixing openings for receiving the fixing pins. This provides a structurally simple mounting and holding of the sealing lip in the drain channel is possible.

According to an embodiment, the support and the fixing pins consist of a thermoplastic material. Preferentially, the ends of the fixing pins following the mounting of the sealing lip can mushroom out thermoplastically. In this way, a fixing of the sealing lip on the support can be achieved in a very simple and automated manner.

According to an embodiment, strips are molded on to the channel wall inside at least in the regions in which the sealing lip has its deepest extension, and the sealing lip elastically presses against the strips from below. This provides an only minor structural change of the drain channel is necessary upon integration of the water drain valve.

According to an embodiment, the strips are interrupted in the region of the two deepest locations of the sealing lip. In this way, minor residual quantities of water can also drain through the gap between neighboring strips since in this location a small opening remains between sealing lip and wall.

According to an embodiment, the strips are provided only in the region of the bent wall regions of the drain channel. In this way, the sealing lip can be simply introduced during the mounting in the drain channel.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
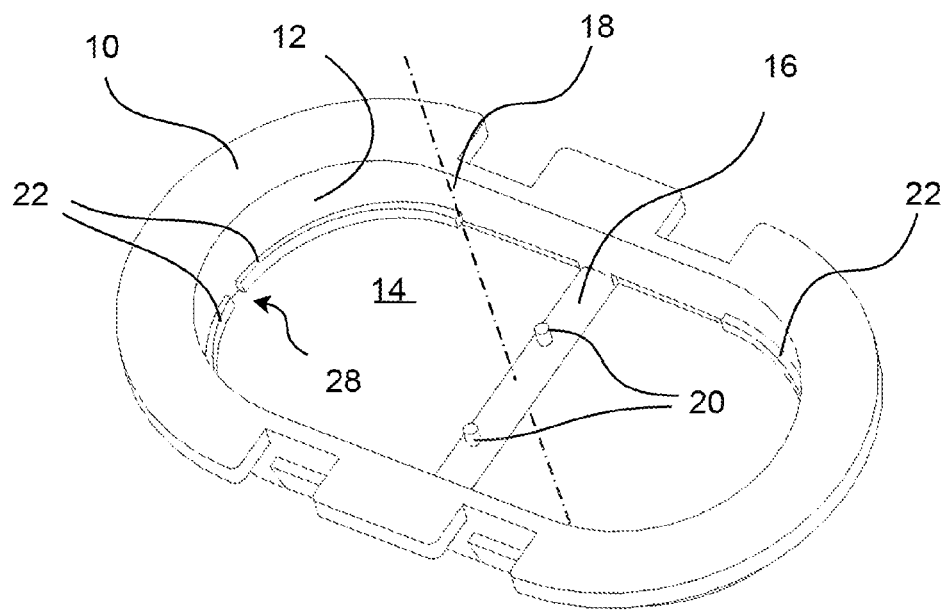
FIG. 1 is a perspective representation of a water box drain channel.

In FIG. 1, a perspective representation of a water box drain channel component 10 is shown, which comprises a channel wall 12 with a channel cross section 14 substantially in the manner of an elongated hole. The drain channel component 10 comprises a support 16, which is molded on to regions of the channel wall 12 located opposite, specifically along the smaller one of the two main axes of the drain channel cross section and perpendicularly to the longitudinal axis 18 of the channel cross section 14. The support 16 comprises two spaced fixing pins 20 directed upwards. Inside, on the channel wall 12, in its bent region, four strips 22 are molded on, the function of which is explained further down below.

Figure 2:
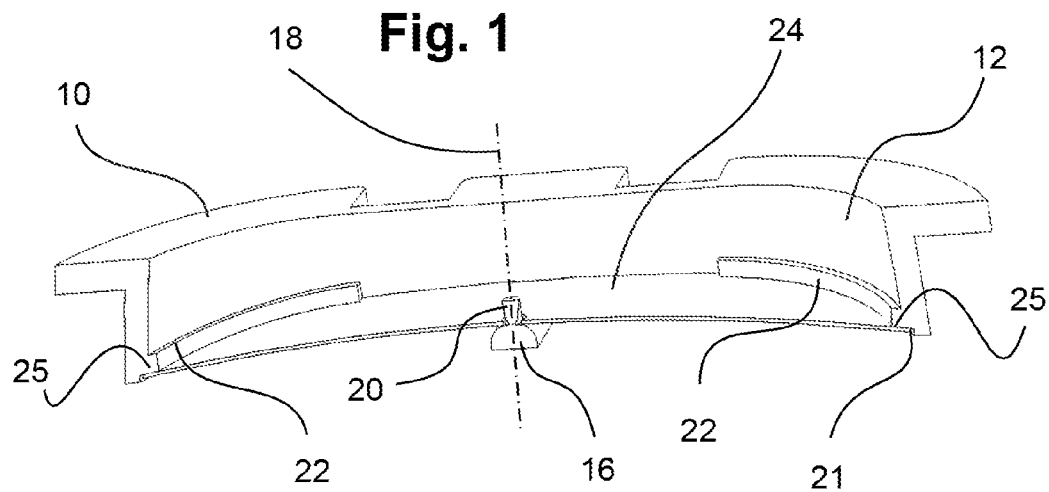
FIG. 2 is a perspective sectional representation of the drain channel with water drain valve.
Figure 3:
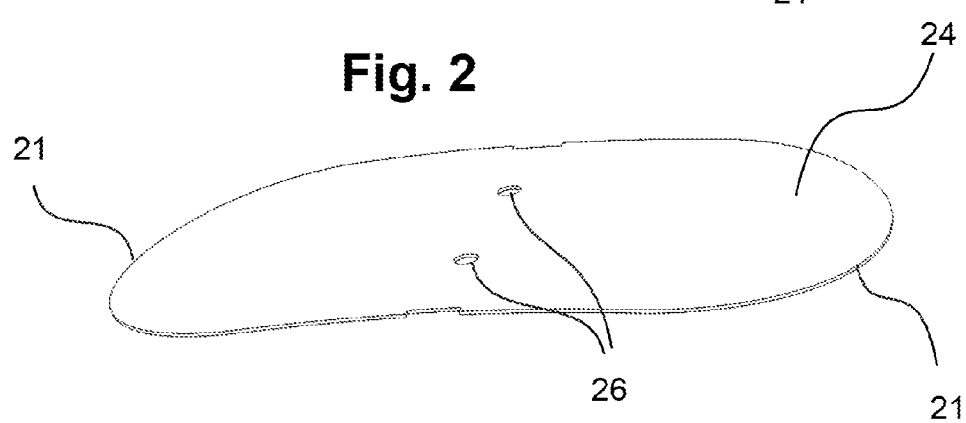
FIG. 3 is a perspective view of a sealing lip.

FIG. 2 shows a perspective sectional representation of the water box drain channel component 10, in which in addition to the structural elements described above a sealing lip 24 is shown, which furthermore is individually shown perspectively in FIG. 3. This sealing lip 24 has two middle openings 26, which are aligned with the fixing pins 20 of the support 16 and serve to hold and fix the sealing lip 24 on the support 16 from the top. The sealing lip 24 which in the relaxed state is preferentially flat is shown in the bent position in FIG. 3, in which it is present in the installed state shown in FIG. 2. The sealing lip 24 which in a plane including the longitudinal axis 18 perpendicularly to the support 16 is elastically bent downwards lies against two of the strips 22 each in the two round corner regions each with the sealing lip edge 21, which are thus aligned corresponding to the bend of the sealing lip 24 in order to make possible an evenly sealing contact along its extension. Because of its elasticity, the two halves of the sealing lip 24 arranged on both sides of the support 16 thus sealingly press against the strips 22 with the sealing lip edge 21 along the surfaces 25 from below. As is shown in FIG. 1, a gap 28 each is located between the respective two strips 22 on both sides. In these two locations located opposite there is thus no sealing with respect to the strips 22, so that in these locations a small slot each between sealing lip 24 and channel wall 12 remains, via which the small residual quantities of water can drain.

In the region of the straight surfaces of the channel wall 12, the sealing lip 24 contacts so closely that a substantial sealing is also ensured there. If required, the strips 22 can also extend as far as that, i.e., as far as in the vicinity of the support 16 except for a small slot region for introducing the sealing lip 24.

As is shown in FIG. 2, the fixing pins 20 following the mounting of the sealing lip 24 are mushroomed out by means of thermal methods in order to prevent an unintentional removal of the sealing lip 24. Instead of the strips 22 molded onto the channel wall 12 on the inside, a shoulder defining the sealing surfaces 25 can also be provided such that the channel wall 12 is thicker above the sealing surfaces 25 than below.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A water drain valve for a water box drain channel of a motor vehicle, the valve comprising:
a channel wall defining the water box drain channel and including a sealing surface facing downstream,
a support extending across the water box drain channel, and
an elastically bent sealing lip supported by the support such that the elastically bent sealing lip extends on both sides of the support in a downstream direction and sealingly presses against the sealing surface.

2. The water drain valve according to claim 1, wherein the water box drain channel has a cross section in the manner of an elongated hole.

3. The water drain valve according to claim 2, wherein the support extends along the smaller one of the two main axes of the cross section of the water box drain channel.

4. The water drain valve according to claim 1, wherein the support comprises a plurality of fixing pins which are directed upwards and the elastically bent sealing lip comprises a plurality of fixing openings for receiving the plurality of fixing pins.

5. The water drain valve according to claim 4, wherein the support and the plurality of fixing pins each comprise a thermoplastic material.

6. The water drain valve according to claim 5, wherein the ends of the plurality of fixing pins are mushroomed to prevent unintentional removal of the sealing lip.

7. The water drain valve according to claim 1, wherein strips are molded on to the channel wall and define the sealing surface facing downstream.

8. The water drain valve according to claim 7, wherein the strips are interrupted and form a gap therebetween.

9. The water drain valve according to claim 7, wherein the strips are only formed in the region of the bent wall regions of the drain channel wall.

10. The water drain valve according to claim 9, wherein four approximately quarter-arc-shaped strips are formed.

11. The water drain valve according to claim 1, wherein the sealing lip has a thickness of 0.2-0.5 mm.

12. A motor vehicle with a water box for discharging water incurred by way of the engine hood or the windshield, comprising a drain channel with a water drain valve, the water drain valve comprising:
a channel wall defining the drain channel and including a sealing surface facing downstream,
a support extending across the drain channel, and
an elastically bent sealing lip supported by the support such that the sealing lip extends on both sides of the support in a downstream direction and sealingly presses against the sealing surface.

13. A water box drain channel component, comprising:
a channel wall defining a channel;
a support having an upstream facing surface and extending across the channel;
at least one strip extending from the channel wall into the channel and defining a downstream facing sealing surface;
a sealing lip supported by the upstream facing surface of the support and engagable with the downstream facing sealing surface.

14. The component according to claim 13, wherein the channel has a cross section in the manner of an elongated hole.

15. The component according to claim 14, wherein the support extends along a smaller one of the two main axes of the cross section of the channel.

16. The component according to claim 13, wherein the support comprises a plurality of fixing pins which are directed upwards and the sealing lip comprises a plurality of fixing openings for receiving the plurality of fixing pins.

17. The component according to claim 13, wherein the at least one strip comprises a plurality of strips with a gap defined between each of the plurality of strips.

* * * * *